(12) United States Patent
Weiss et al.

(10) Patent No.: US 11,969,882 B2
(45) Date of Patent: Apr. 30, 2024

(54) MATERIAL HANDLING VEHICLE BEHAVIOR MODIFICATION BASED ON TASK CLASSIFICATION

(71) Applicant: The Raymond Corporation, Greene, NY (US)

(72) Inventors: Joseph A. Weiss, Greene, NY (US); Fernando D. Goncalves, Vestal, NY (US)

(73) Assignee: The Raymond Corporation, Greene, NY (US)

(*) Notice: Subject to any disclaimer, the term of this patent is extended or adjusted under 35 U.S.C. 154(b) by 437 days.

(21) Appl. No.: 16/950,891

(22) Filed: Nov. 17, 2020

(65) Prior Publication Data

US 2021/0154861 A1    May 27, 2021

Related U.S. Application Data

(60) Provisional application No. 62/938,622, filed on Nov. 21, 2019.

(51) Int. Cl.
| | | |
|---|---|---|
| *B25J 13/08* | (2006.01) | |
| *B65G 67/02* | (2006.01) | |
| *B66F 9/07* | (2006.01) | |
| *B66F 9/075* | (2006.01) | |
| *G05B 19/41* | (2006.01) | |
| *G05B 19/4155* | (2006.01) | |

(52) U.S. Cl.
CPC ............ *B25J 13/088* (2013.01); *B65G 67/02* (2013.01); *B66F 9/0755* (2013.01); *G05B 19/4155* (2013.01); *G05B 2219/45049* (2013.01)

(58) Field of Classification Search
CPC ...... B25J 13/088; B65G 67/02; B66F 9/0755; G05B 19/4155; G05B 2219/45049
See application file for complete search history.

(56) References Cited

U.S. PATENT DOCUMENTS

| | | |
|---|---|---|
| 4,517,645 A | 5/1985 | Yuki |
| 4,942,529 A | 7/1990 | Avitan |
| 7,706,947 B2 | 4/2010 | Bozem |
| 7,720,586 B2 | 5/2010 | Harumoto |
| 8,593,272 B2 | 11/2013 | Heracles |
| 8,849,492 B2 | 9/2014 | Uno |

(Continued)

FOREIGN PATENT DOCUMENTS

| | | |
|---|---|---|
| CN | 107406050 A | 11/2017 |
| CN | 109891377 A | 6/2019 |

(Continued)

*Primary Examiner* — Saul Rodriguez
*Assistant Examiner* — Ashley K Romano
(74) *Attorney, Agent, or Firm* — Quarles & Brady LLP

(57) ABSTRACT

Systems and methods for material handling vehicle task classification are provided. A method for task characterization on a material handling vehicle comprises monitoring data communicated between one or more on-board sensors and a vehicle controller on the material handling vehicle. The method further comprises identifying a repletion or pattern in the monitored data, and determining that the repetition or pattern in the monitored data is a vehicle task. The method also comprises modifying an operational parameter of the material handling vehicle based on the determined vehicle task.

20 Claims, 11 Drawing Sheets

(56) References Cited

U.S. PATENT DOCUMENTS

| | | | |
|---|---|---|---|
| 9,207,673 B2* | 12/2015 | Pulskamp | B66F 17/003 |
| 9,522,817 B2* | 12/2016 | Castaneda | B66F 9/07509 |
| 9,567,168 B1* | 2/2017 | Tibbens | B65G 69/24 |
| 9,919,606 B2 | 3/2018 | Barrass | |
| RE47,108 E | 10/2018 | Jacobus | |
| 10,549,973 B2 | 2/2020 | Puke | |
| 10,766,751 B2* | 9/2020 | Kirk | B66F 9/07572 |
| 10,819,742 B2* | 10/2020 | Ogawa | H04L 67/12 |
| 10,956,567 B2* | 3/2021 | Ogawa | G05B 19/0428 |
| 11,167,421 B2* | 11/2021 | Sinnet | A23L 19/18 |
| 11,351,673 B2* | 6/2022 | Zito | G06Q 10/087 |
| 11,472,337 B2* | 10/2022 | Manci | G01C 21/206 |
| 2005/0159851 A1 | 7/2005 | Engstrom | |
| 2006/0293819 A1 | 12/2006 | Harumoto | |
| 2009/0152052 A1 | 6/2009 | Schoettke | |
| 2012/0107077 A1 | 5/2012 | Alveteg | |
| 2012/0123614 A1 | 5/2012 | Laws | |
| 2014/0199142 A1* | 7/2014 | Criswell | B65G 67/08 414/809 |
| 2014/0277958 A1 | 9/2014 | Yahner | |
| 2016/0078694 A1 | 3/2016 | Swift | |
| 2016/0368493 A1 | 12/2016 | Driscall | |
| 2017/0297879 A1 | 10/2017 | Franzen | |
| 2018/0059682 A1 | 3/2018 | Thode | |
| 2019/0119089 A1 | 4/2019 | Swift | |
| 2020/0152197 A1 | 5/2020 | Penilla | |
| 2020/0225681 A1 | 7/2020 | Stein | |

FOREIGN PATENT DOCUMENTS

| | | |
|---|---|---|
| EP | 3000772 A1 | 3/2016 |
| EP | 3263511 A1 | 1/2018 |

* cited by examiner

MATERIAL HANDLING VEHICLE BEHAVIOR MODIFICATION BASED ON TASK CLASSIFICATION

CROSS-REFERENCE TO RELATED APPLICATION

This application is based on and claims priority to U.S. Provisional Patent Application No. 62/938,622, filed Nov. 21, 2019, and entitled "Vehicle Behavior Modification Based on Task Classification," which is incorporated herein by reference in its entirety.

STATEMENT REGARDING FEDERALLY SPONSORED RESEARCH

Not Applicable.

BACKGROUND

Generally, material handling vehicles may transport goods in industrial settings (e.g., warehouses, factories, etc.).

BRIEF SUMMARY

The present disclosure relates generally to a camera or sensor input system and, more specifically, to a vehicle behavior modification system that can identify activities and change its behavior characteristics to better suit that activity.

Generally, the present disclosure provides a vehicle classification system. The vehicle classification system can be a part of a typical material handling vehicle, and is configured to recognize an activity or task that the vehicle is performing and modify the behavior of the vehicle to assist the operator during performance of the activity or task.

In one aspect, the present disclosure provides a method for task characterization on a material handling vehicle. The method comprises monitoring data communicated between one or more on-board sensors and a vehicle controller on the material handling vehicle. The method also comprises identifying a repetition or pattern in the monitored data. The repetition or pattern includes picking up an object, moving forks-first less than or equal to a first predefined distance, detecting that the material handling vehicle drives over a feature in a floor, placing the object, moving tractor-first less than or equal to a second predefined distance, and detecting that the material handling vehicle drives over the feature in the floor. The method further comprises determining that the repetition or pattern in the monitored data is a vehicle task. The vehicle task is classified as loading or unloading a trailer. The vehicle task also comprises modifying an operational parameter of the material handling vehicle based on the determined vehicle task.

In another aspect, the present disclosure provides a method for task characterization on a material handling vehicle. The method comprises monitoring data communicated between one or more on-board sensors and a vehicle controller on the material handling vehicle. The material handling vehicle comprises a mast and forks. The method also comprises identifying a repetition or pattern in the monitored data. The repetition or pattern includes picking up an object at floor level, moving less than or equal to a predefined distance, placing the object, and moving less than or equal to the predefined distance. The method further comprises determining that the repetition or pattern in the monitored data is a vehicle task. The vehicle task is classified as loading or unloading a trailer. The method also comprises reducing a maximum height of the mast or the forks to below a predetermined height based on the vehicle task.

In yet another aspect, the present disclosure provides a method for task characterization on a material handling vehicle. The method comprises monitoring data communicated between one or more on-board sensors and a vehicle controller on the material handling vehicle. The material handling vehicle comprises a mast and forks. The method also comprises identifying a repetition or pattern in the monitored data. The repetition or pattern includes picking up an object at floor level, moving a first predefined distance, placing the object, and moving a second predefined distance. The method further comprises determining that the repetition or pattern in the monitored data is a vehicle task once the repetition or pattern has been repeated one or more times. The vehicle task is loading or unloading a trailer. The method also comprises modifying an operational parameter of the material handling vehicle based on the determined vehicle task. The operational parameter is a maximum height of the mast or the forks.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
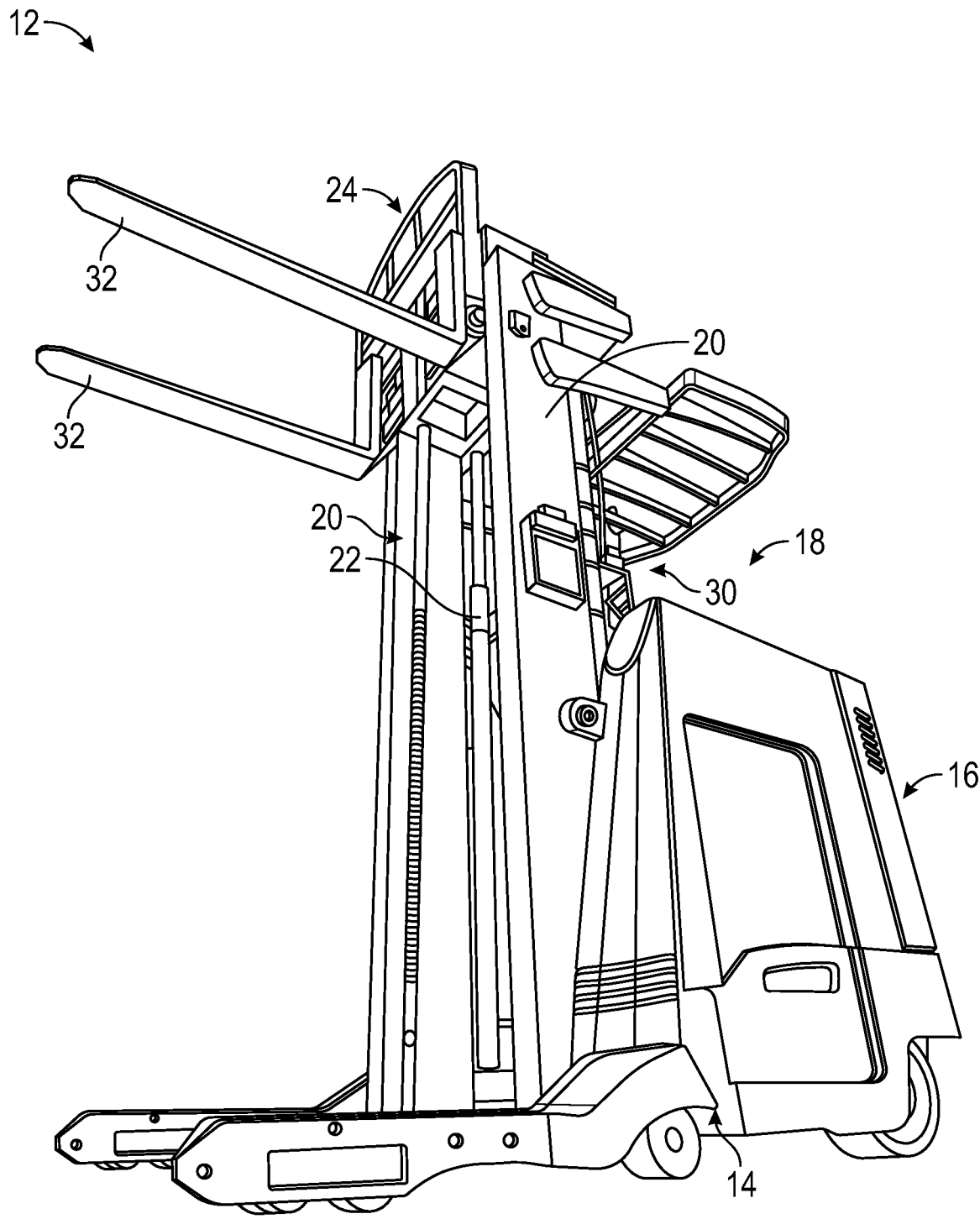
FIG. 1 is a perspective view of a material handling vehicle according to one aspect of the present disclosure.

Before any aspects of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is also to be appreciated that material handling vehicles are designed in a variety of configurations to perform a variety of activities or tasks. It will be apparent to those of skill in the art that the present disclosure is not limited to any specific material handling vehicle, and can also be provided with various other types of vehicle configurations, including for example, orderpickers, SWING-REACH® vehicles, and any other lift vehicles. The various systems and methods disclosed herein are suitable for any of driver controlled, pedestrian controlled, remotely controlled, and autonomously controlled material handling vehicles.

FIG. 1 illustrates one non-limiting example of a material handling vehicle (MHV) 12 in the form of a reach truck according to one non-limiting example of the present disclosure. The material handling vehicle 12 can include a vehicle frame 14, a base or power section 16, an operator compartment 18, a telescoping mast 20, one or more hydraulic actuators 22, and a fork assembly 24. The vehicle frame 14 may support the power section 16 and the operator compartment 18 thereon. The power section 16 may include, for example, a motor, a transmission, and a battery, among other compartments.

The operator compartment 18 may include a platform (not shown) on which an operator may stand and vehicle controls 30. In some non-limiting examples, the vehicle controls 30 may be in the form of a control handle and/or a display screen that an operator may manipulate to control the material handling vehicle 12.

The telescoping mast 20 can be coupled to the hydraulic actuators 22 such that the hydraulic actuators 22 can selectively extend or retract the telescoping mast 20. The fork assembly 24 can be coupled to the telescoping mast 20 so that when the telescoping mast 20 is extended or retracted, the fork assembly 24 can also be raised or lowered. The fork assembly 24 can further include one or more forks 32 on which various loads (not shown) can be manipulated or carried by the material handling vehicle 12.

Figure 2:
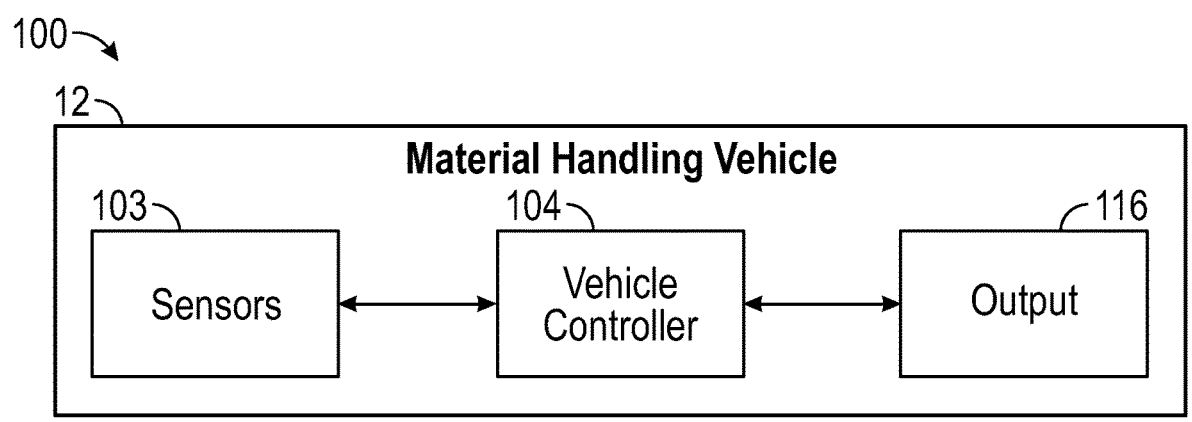
FIG. 2 is a schematic illustration of a vehicle classification system of a vehicle according to one aspect of the present disclosure.

FIG. 2 illustrates one non-limiting example of a vehicle classification system 100 according to the present disclosure. The vehicle classification system 100 can include or be performed on the material handling vehicle 12. In some non-limiting examples, the material handling vehicle 12 can be an order picker, a reach vehicle, and SWING-REACH® lift truck, or any other type or material handling vehicle that may perform tasks in a facility or warehouse environment.

The material handling vehicle 12 can include a plurality of sensors 103 that are in communication with a vehicle controller 104. The sensors 103 can be configured to monitor operating characteristics of the material handling vehicle 12 (e.g., temperatures, pressures, speed, direction, detect surrounding objects, etc.). Each of the plurality of sensors 103 can be in communication with the vehicle controller 104. The vehicle controller 104 can be configured to read the quantities measured or discrete signals produced by the plurality of sensors 103 and, for example, alert an operator, via a visual and/or audible indicator, if one or more of the plurality of sensor 103 measures a quantity or pattern that meets the conditions for classifying the activity or event. In addition, the vehicle controller 104 can be configured to alert the operator if an activity or task is being performed or repeated, e.g., carrying a load. Moreover, the sensors 103 can also monitor internal characteristics of the material handling vehicle 12 (e.g., vehicle speed, fork height, battery voltage, lift motor RPM, etc.).

In operation, for example, the vehicle controller 104 can be configured to control the operation of the material handling vehicle 12. The vehicle controller 104 can communicate with the sensors 103, for example, via a Controller Area Network (CAN) bus network or another form of wired or wireless communication. In this way, for example, the vehicle controller 104 may receive real-time feedback from the sensors 103, such that the vehicle controller 104 can determine the activity or operation being currently performed by the material handling vehicle 12, as will be described herein.

The vehicle controller 104 may include a processor that includes memory for the material handling vehicle 12. Additionally, the vehicle controller 104 can pull data from the sensors 103 to store and identify an activity being performed. Further, the vehicle controller 104 can also be in communication with different components of the material handling vehicle 12, such as the engine/motor, battery, lift cylinders, throttle, steering, traction wheel, etc., in order to control their various outputs. In general, the vehicle controller 104 can receive a signal from the sensors 103 and set an output 116 for the material handling vehicle 12. For example, the vehicle controller 104 can set the material handling vehicle 12 to a specific speed or move the forks of the material handling vehicle 12 to a specific height.

Depending on the activity identified by the vehicle controller 104, the output 116 is designed to advantageously assist the operator, or an autonomous vehicle, during the present activity. For example, if the vehicle controller 104 receives information that the material handling vehicle 12 is operating at high speeds, the vehicle controller 104 can send a signal to lower the sensitivity of the steering.

Figure 3:
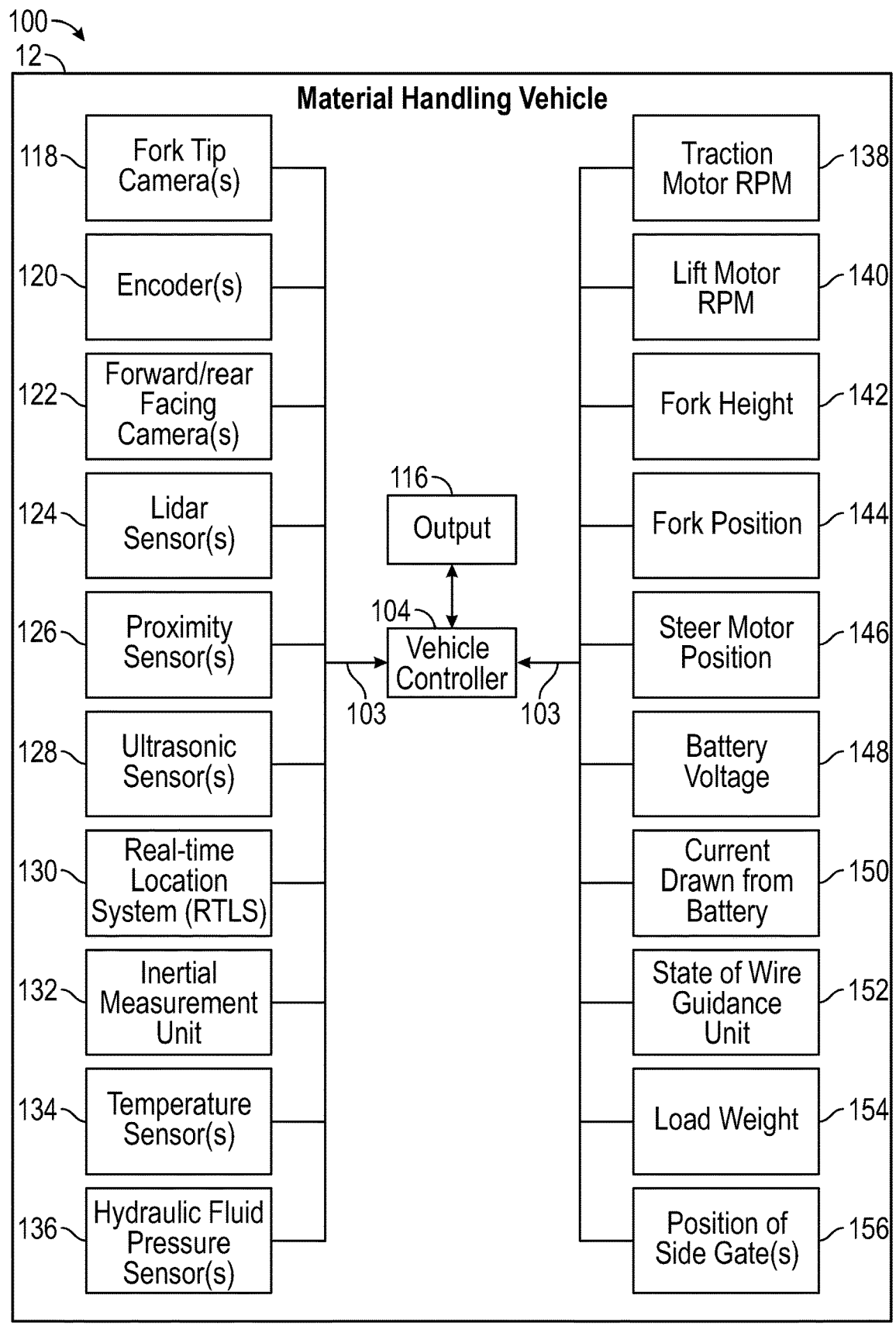
FIG. 3 is schematic illustration of a vehicle classification system in communication with a plurality of sensors according to one aspect of the present disclosure.

As shown in FIG. 3, the vehicle controller 104 may be in communication with various components and sensors 103 on the material handling vehicle 12. For example, the vehicle controller 104 can be in communication with the plurality of sensors 103 that can include, but are not limited to, a fork tip camera 118, an encoder 120, a forward/rear facing camera 122, a lidar sensor 124, a proximity sensor 126, an ultrasonic sensor 128, a real-time location system 130, an inertial measurement unit 132, a temperature sensor 134, and a hydraulic fluid pressure sensor 136. In addition, the vehicle controller 104 can be in communication with internal signals from the plurality of sensors 103 that can include, but are not limited to, a traction motor RPM 138, a lift motor RPM 140, a fork height 142, a fork position 144, a steer motor position 146, a battery voltage 148, a current drawn from a battery 150, a state of wire guidance unit 152, a load weight 154, and a position of a side gate 156. During operation, the vehicle controller 104 can process the information from the sensors 103 and determine the vehicle output 116. The type and number of sensors 103 illustrated in FIG. 3 are exemplary in nature and, in some non-limiting examples, a given material handling vehicle utilizing the vehicle classification systems and methods described herein may include more or less sensors of varying type and configuration.

Alternatively or additionally, the vehicle classification system 100 may analyze an operator's inputs, or inputs to an autonomous vehicle (e.g., from a warehouse management system (WMS)) to infer context or analyze patterns in the vehicle outputs 116. For example, the vehicle classification system 100 may identify context from the operator explicitly telling the vehicle classification system 100 what function the operator is performing, a WMS explicitly telling the vehicle classification system 100 what function the operator is performing, a visual placard or marker that is posted in the facility, a transponder that transmits a signal wirelessly (e.g. Wi-Fi, Bluetooth, etc.), or through any other communication methods (e.g. narrowcasting, leaky coax cable, etc.).

FIG. 2 and FIG. 3 depict a simplified version of the vehicle classification system 100. The examples are to be non-limiting and the vehicle classification system 100 can include one or more vehicle controllers 104 or outputs 116. Additionally, the vehicle classification system 100 can include a plurality of electrical components that allow information to flow from the plurality of sensors 103 to the operator or controller 104.

Figure 4:
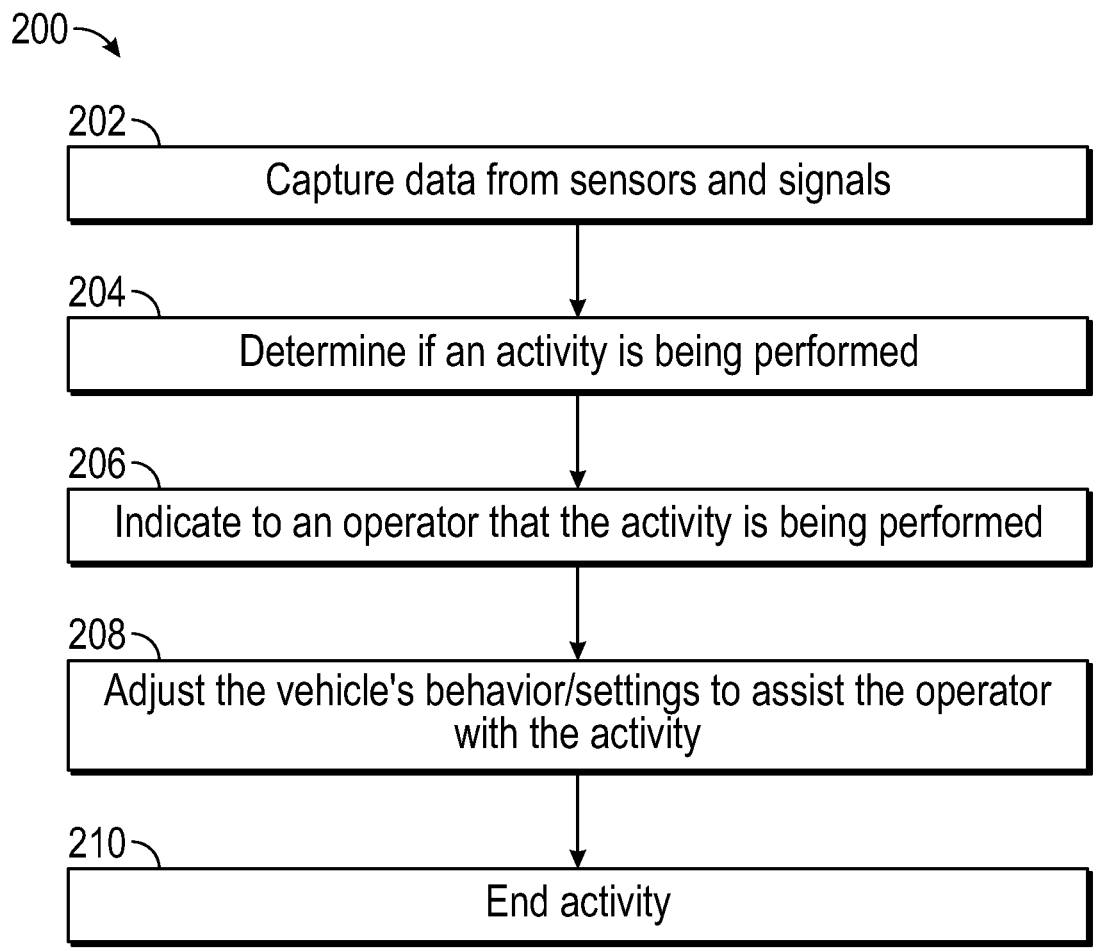
FIG. 4 is a process or method outlining the steps performed by a vehicle classification system according to one aspect of the present disclosure.

Operation of the vehicle classification system 100 will be described with reference to FIGS. 1-10 by way of various non-limiting examples. For example, FIG. 4 illustrates a process or method 200 the vehicle classification system 100 may undergo. Initially, at process block 202, the material handling vehicle 12 can be operating in a standard mode where the vehicle controller 104 can be configured to instruct the material handling vehicle 12 to perform standard operating tasks based on inputs from an operator or external management system. While the material handling vehicle 12 is performing standard operating tasks, the sensors 103 can constantly be capturing data from the material handling vehicle 12 and/or the surrounding environment to determine an activity being performed by the material handling vehicle 12. The data can be stored in the vehicle controller 104 where, in process block 204, it is then determined whether that data matches with preexisting conditions that indicates an activity or task is being performed. Put differently, the vehicle classification system 100 can monitor the data communicated between the one or more on-board sensors 103 and the vehicle controller 104. The vehicle classification system 100 can then identify a repletion or pattern in the monitored data and classify the repetition or pattern in the monitored data as a vehicle task. In other words, the incoming data is processed through the vehicle controller 104 such that the vehicle classification system 100 can determine if a specific activity or task is being performed by the operator. For example, the sensors 103 may indicate to the vehicle controller 104 that the material handling vehicle 12 is constantly going back and forth into a dark enclosure. The vehicle controller 104 may then compare this data with other sensor information, and the vehicle controller 104 may determine that the material handling vehicle 12 is loading or unloading a trailer. If no task is determined, the vehicle controller 104 can continue to gather data until an activity or task can be determined. In an alternative embodiment, the material handling vehicle 12 may simply be a pass-through for the incoming data from the sensors 103. In such an embodiment, the data may be processed away from the material handling vehicle 12, i.e., an external system, for example, and then the result may be communicated back to the material handling vehicle 12 for implementation. In a further embodiment, the vehicle controller 104 may perform a minimal amount of data processing prior to sending the data to an external site or system. After the external system receives the data, the external system may recognize any broader patterns and communicate to the material handling vehicle 12 when an event may be classified.

Once an activity is determined at process block 204, the vehicle classification system 100 may indicate to the operator that the activity is being performed at process block 206. In other words, the operator of the material handling vehicle 12 may be notified of the vehicle task once the repetition or pattern is classified. In the illustrated non-limiting example, the vehicle classification system 100 can ask the operator if this is the correct activity being performed. The operator can then accept or decline the task that is indicated by the vehicle classification system 100. Once the operator accepts the activity, the vehicle classification system 100 may adjust the behavior or settings of the material handling vehicle 12, at process block 208, to assist the operator with the activity. Put differently, the vehicle classification system may modify an operational parameter of the material handling vehicle 12 based on the vehicle task identified. Continuing with the example above, the vehicle classification system 100 may recognize that it is being used to load a trailer at process block 204. The vehicle classification system 100 can then send the operator a notification indicating that the material handling vehicle 12 is being used to load or unload a trailer at process block 206. If this is the correct activity being performed, the operator may then accept or continue to perform the activity. The vehicle classification system 100 may then adjust the material handling vehicle 12 to assist the operator on the activity, detailed below, at process block 208. Finally, the operator or the vehicle classification system 100 can end the activity at process block 210.

In another embodiment, the vehicle classification system 100 may notify the operator, via a display or the like, that the material handling vehicle 12 is performing a certain activity and the vehicle classification system 100 automatically modify one or more operating parameters of the material handling vehicle 12. In this case, for example, the operator can then continue using the change if it is the correct activity. If it is not the correct activity, the operator may have the ability to veto or stop the change in operational parameters from occurring. In some non-limiting examples, the vehicle classification system 100 may not indicate to the operator that an activity is being performed. In this case, for example, once the activity is recognized by the vehicle controller 104, the vehicle classification system 100 may automatically adjust the material handling vehicle 12 to help better perform the activity. In a further non-limiting example, the vehicle classification system 100 may be equipped on an autonomous material handling vehicle in which no indication to an operator may be required. In such an example, a third party system may be able to monitor or view the activity that the autonomous material handling vehicle is performing.

Figure 5:
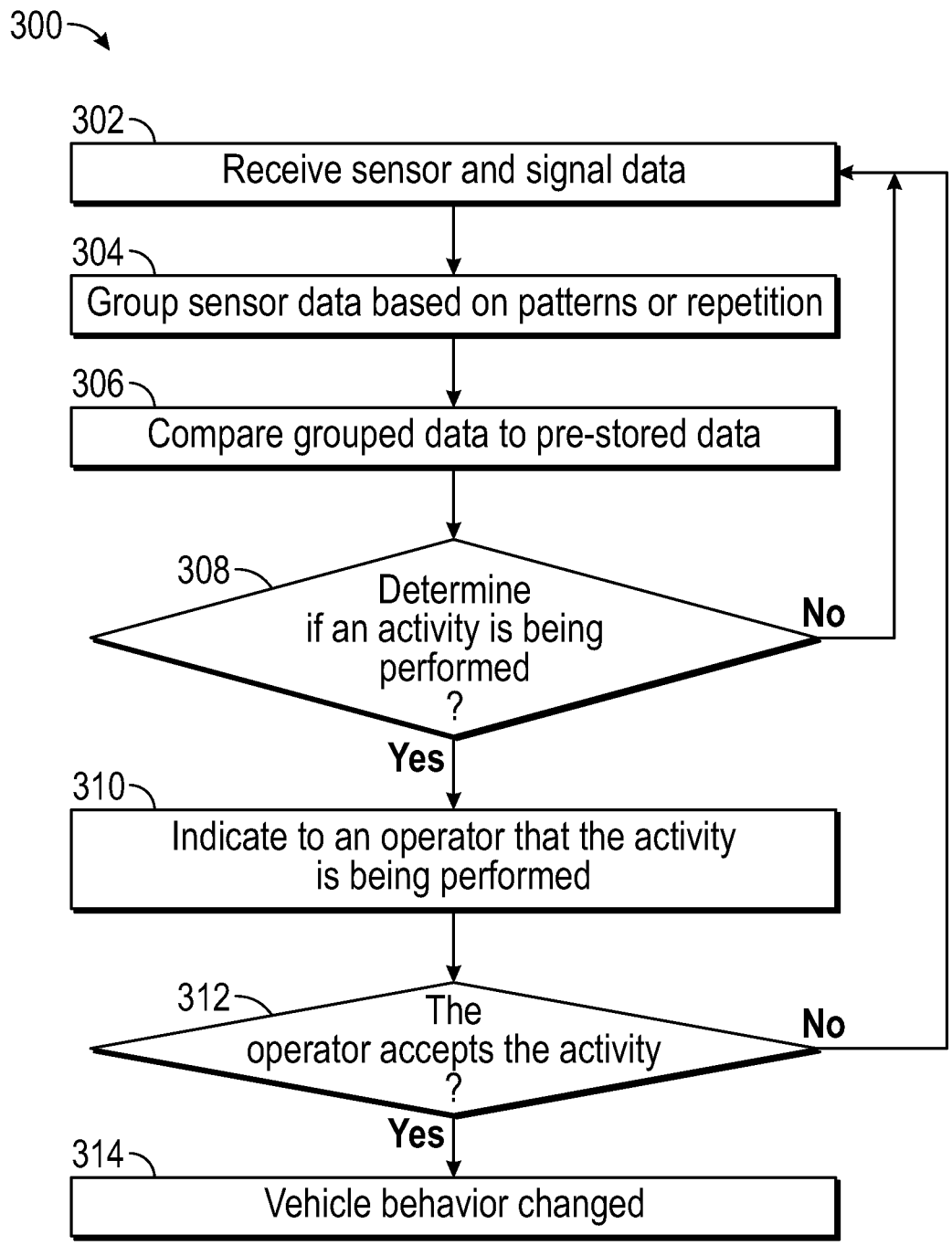
FIG. 5 is a flowchart illustrating steps performed by a vehicle classification system according to one aspect of the present disclosure.

FIG. 5 illustrates an example of a sequence of steps 300 the vehicle controller 104 may undergo by the vehicle classification system 100. In step 302, the material handling vehicle 12 may be operating in its standard mode with the sensors 103 sending data to the vehicle controller 104. Once the vehicle controller 104 receives the data, the data can be grouped based on patterns or repetitions at step 304. After the data is grouped by common patterns and repetitions, the grouped data can be compared to pre-stored data located in the vehicle controller 104 of the vehicle classification system 100 at step 306. The vehicle controller 104 can then determine, at step 308, whether there are any matches between the grouped data, collected at steps 302 and 304, and the stored data. In some non-limiting examples, the data may be compared to pre-stored data located on-board or externally from the material handling vehicle 12.

If the vehicle controller 104 determines at step 308 that a match exists, then the vehicle controller 104 may indicate to the operator that an activity is being performed at step 310. However, if at step 308 no match is found, the vehicle classification system 100 can return to step 302 so that it can receive data from the sensors 103 until a group is found and classified as an activity. At step 312, the operator can decide if the correct activity was determined by the vehicle controller 104 and the vehicle classification system 100. If the activity is correct, the vehicle controller 104 can change the vehicle behavior of the material handling vehicle 12 in step 314. The behavior may be changed to better assist the operator to successfully and efficiently complete the activity. If the activity is not correct, the vehicle classification system 100 may return to step 302 to monitor the activity of the material handling vehicle 12. As described above, in some non-limiting example, the operator may not need to accept the activity. For example, once an activity has been determined at step 308, the vehicle controller 104 can automatically change the vehicle behavior of the material handling vehicle 12 in step 314, i.e., bypassing step 310 and step 312. In another non-limiting example, the vehicle controller 104 may not need to group the sensor data before matching it with the pre-stored data. Instead, the vehicle controller 104 may receive one type of signal from the sensors 103 and alter the material handling vehicle 12 accordingly.

The process of FIG. 5 describes the vehicle classification system's 100 ability to recognize the type of activity it is performing and modify its own behavior in ways that may be advantageous to the operator based on the situation. At steps 302, 304, 306, 308 the vehicle classification system 100 can be able to recognize the context of its actions by way of the sensors 103 and by interpreting the patterns of signals from its inputs and outputs. At step 310, the vehicle classification system 100 may then notify the operator via a display, or another non-limiting example, that it believes the operator is performing a certain activity and has therefore automatically initiated certain changes at step 314. At step 312, the operator may then have the ability to override and cancel the changes, if desired, to the operating parameters. In one embodiment, the feedback by the operator at step 312 can then be used to further refine the vehicle classification system 100. For example, the feedback provided by the operator at step 312 can be stored and used to set preferences depending on the operator.

In some non-limiting examples, the vehicle classification system 100 may identify the task or activity being performed by the material handling vehicle 12 through CAN data. In particular, the vehicle classification system 100 may be programed to identify features in the CAN data that correspond to key events and identify patterns that correspond to operator behaviors. For example, the vehicle classification system 100 may use the raw CAN data from the traction motor RPM 138, the lift motor RPM 140, or the load weight 154 to classify sequences of actions into tasks (e.g., Pick-at-floor→Place-at-height=Put Away). Once a task is classified from the CAN data, the vehicle classification system 100 can modify an operational parameter of the material handling vehicle 12 based on the task classified.

Figure 6A:
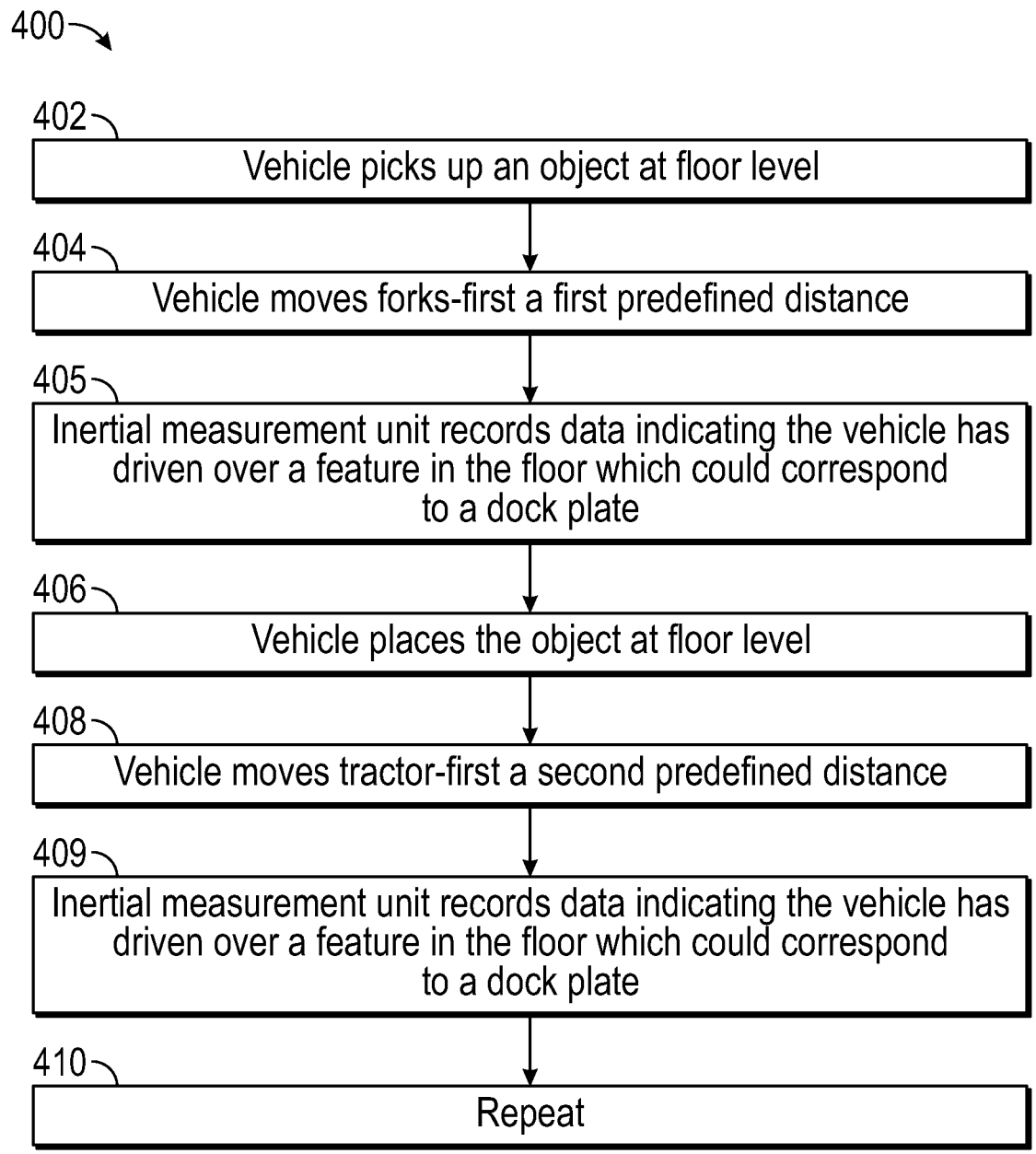
FIG. 6A is a process or method recognized by a vehicle classification system according to one aspect of the present disclosure.

FIG. 6A illustrates a non-limiting process of a vehicle task 400 that the vehicle classification system 100 may recognize as an activity or pattern while it is operating, according to one non-limiting example of the present disclosure. The task 400 may result in the vehicle classification system 100 manipulating the material handling vehicle 12 to assist the operator in performing the activity. All of the following steps may be recognized through the quantities measured or discrete signals communicated between the plurality of sensors 103 and the vehicle controller 104. First, the task 400 may include the material handling vehicle 12 picking up an object at floor level at process block 402. Then, the material handling vehicle 12 may travel or move forks-first less than or equal to a first predefined distance (e.g., between about 50 and 200 feet, or less than about 200 feet) at process block 404. This distance is non-limiting and can be preset depending on the characteristics of the material handling vehicle 12, warehouse, docking station, trailer, etc. Between process blocks 404 and 406 the sensory system may record data from the inertial measurement unit 132 corresponding to the vehicle driving over the dock plate to enter the trailer, at process block 405. Once the material handling vehicle 12 has stopped, the object can be placed at floor level or above floor level at process block 406. The material handling vehicle 12 may then travel or move tractor-first a second predefined distance (e.g., between 50 and 200 feet, or less than 200 feet) at process block 408. In some non-limiting examples, the second predefined distance may be within a predetermined tolerance of the first predefined distance. For example, the second predefined distance may be within plus or minus 5% of the first predefined distance, or within plus or minus 10% of the first predefined distance, or within plus or minus 15% of the first predefined distance, or within plus or minus 20% of the first predefined distance, or within plus or minus 25% of the first predefined distance, or within plus or minus 30% of the first predefined distance, or within plus or minus 35% of the first predefined distance, or within plus or minus 40% of the first predefined distance, or within plus or minus 45% of the first predefined distance, or within plus or minus 50% of the first predefined distance.

Between process blocks 408 and 410 the sensory system may record data from the inertial measurement unit 132 corresponding to the vehicle driving back over the dock plate to enter or exit the trailer, at process block 409. Finally, if this entire task 400 is repeated at process block 410, then the vehicle classification system 100 may recognize that this series of activities indicates that the material handling vehicle 12 is loading or unloading a tractor trailer.

In one example, the forward or rear facing cameras 122, the fork position 144, and the real-time location system 130 may be some of the sensors 103 that the vehicle controller 104 uses to determine that the material handling vehicle 12 is performing the activity of task 400 (see, e.g., FIGS. 3 and 6A). In alternative embodiments, the vehicle classification system 100 may recognize between loading and unloading a trailer based on the direction of travel and the load. For example, when the material handling vehicle 12 is loading a trailer, the vehicle classification system 100 may recognize that the material handling vehicle 12 is loaded when traveling forks-first and unloaded when traveling tractor-first. Additionally, when the material handling vehicle 12 is unloading a trailer, the material handling vehicle 12 is unloaded when traveling forks-first and loaded when traveling tractor-first.

The prediction may further be corroborated with images captured from a camera or a positioning system mounted on the material handling vehicle 12. After the activity or pattern has been identified, the vehicle's settings can be modified in a predetermined and configurable fashion. In the case of task 400, a lift limit bypass feature (i.e., a maximum height of the mast 20 and/or the forks 32 may be reduced to a predefined height) may be turned on with a value to prevent the forks 32 and/or the mast 20 from exceeding a trailer ceiling height.

Figure 6B:
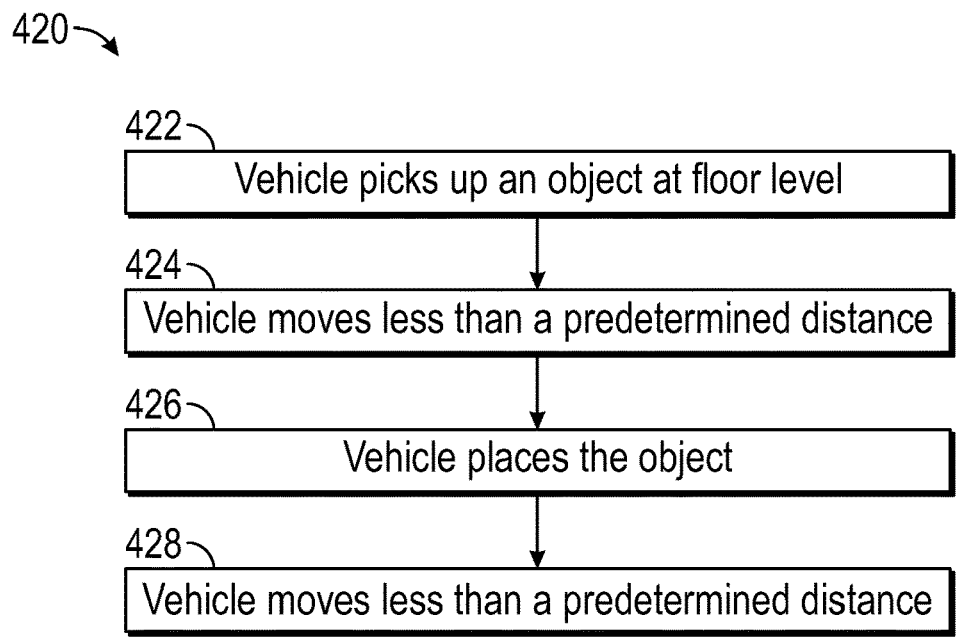
FIG. 6B is another process or method recognized by a vehicle classification system according to one aspect of the present disclosure.

FIG. 6B illustrates another non-limiting process of a vehicle task 420 that the vehicle classification system 100 may recognize as an activity or pattern while it is operating. The task 420 may result in the vehicle classification system 100 manipulating the material handling vehicle 12 to assist the operator in performing the activity. All of the following steps may be recognized through the quantities measured or discrete signals communicated between the plurality of sensors 103 and the vehicle controller 104. First, the task 420 may include the material handling vehicle 12 picking up an object at floor level at process block 422. Then, the material handling vehicle 12 may travel or move less than or equal to a predefined distance (e.g., less than or equal to about 100 feet) at process block 424. This distance is non-limiting and can be preset depending on the characteristics of the material handling vehicle 12, warehouse, docking station, trailer, etc. Once the material handling vehicle 12 has stopped, the object can be placed at process block 426. In some non-limiting examples, the material handling vehicle 12 may place the object down at floor level. In other non-limiting examples, the material handling vehicle 12 may place the object on a shelf or other structure suspended above the ground, i.e., at a height above the ground/floor level. The material handling vehicle 12 may then travel or move less than or equal to the predefined distance at process block 428. Once the material handling vehicle 12 preforms the task 420, then the vehicle classification system 100 may recognize that this series of activities (e.g., a short distance transport, a unloading or loading event, and another short distance transport) indicates that the material handling vehicle 12 is loading or unloading a tractor trailer.

During operation of the vehicle classification system 100, the forward or rear facing cameras 122, the encoders 120, the fork position 144, the load weight 154, and/or the real-time location system 130 may be some of the sensors 103 that the vehicle controller 104 uses to determine that the material handling vehicle 12 is performing the activity of task 420 (see, e.g., FIG. 3). In one non-limiting example, a traction wheel encoder distance may be used to determine the distance moved by the material handling vehicle 12. The prediction may further be corroborated with images captured from a camera or a positioning system mounted on the material handling vehicle 12. After the activity has been identified, the vehicle's settings can be modified in a predetermined and configurable fashion. In the case of task 420, similar to the task 400, a lift limit bypass feature (i.e., a maximum height of the mast 20 and/or the forks 32 may be reduced to a predefined height) may be turned on with a value to prevent the forks 32 and/or the mast 20 from exceeding a trailer ceiling height. In some non-limiting examples, the vehicle's settings may be modified to advantageously assist the operator and/or the material handling vehicle 12 with alternative or additional setting modifications.

Figure 6C:
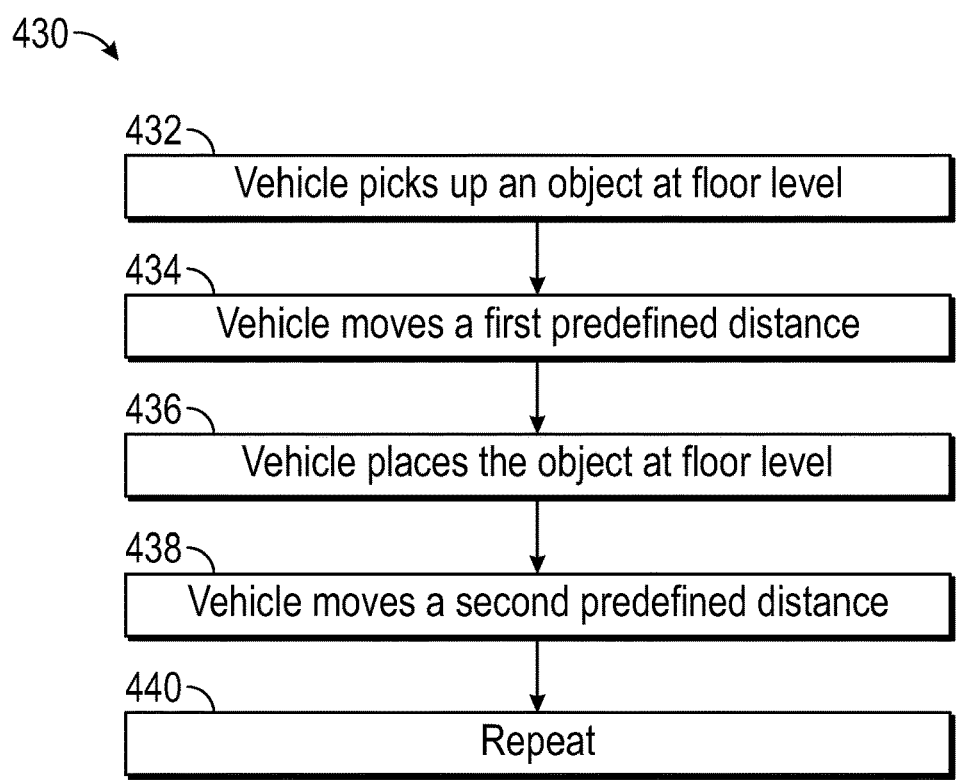
FIG. 6C is yet another process or method recognized by a vehicle classification system according to one aspect of the present disclosure.

FIG. 6C illustrates yet another non-limiting process of a vehicle task 430 that the vehicle classification system 100 may recognize as an activity while it is operating. The task 430 may result in the vehicle classification system 100 manipulating the material handling vehicle 12 to assist the operator in performing the activity. All of the following steps may be recognized through the quantities measured or discrete signals communicated between the plurality of sensors 103 and the vehicle controller 104. First, the task 430 may include the material handling vehicle 12 picking up an object at floor level at process block 432. Then, the material handling vehicle 12 may travel or move less than or equal to a first predefined distance (e.g., less than or equal to about 100 feet) at process block 434. This distance is non-limiting and can be preset depending on the characteristics of the material handling vehicle 12, warehouse, docking station, trailer, etc. Once the material handling vehicle 12 has stopped, the object can be placed at floor level or above floor level at process block 436. The material handling vehicle 12 may then travel or move less than or equal to a second predefined distance at process block 438. In some non-limiting examples, the second predefined distance may be within a predetermined tolerance of the first predefined distance. For example, the second predefined distance may be within plus or minus 5% of the first predefined distance, or within plus or minus 10% of the first predefined distance, or within plus or minus 15% of the first predefined distance, or within plus or minus 20% of the first predefined distance, or within plus or minus 25% of the first predefined distance, or within plus or minus 30% of the first predefined distance, or within plus or minus 35% of the first predefined distance, or within plus or minus 40% of the first predefined distance, or within plus or minus 45% of the first predefined distance, or within plus or minus 50% of the first predefined distance.

Finally, if this entire task 430 is repeated one or more additional times at process block 440, then the vehicle classification system 100 may recognize that this series of activities indicates that the material handling vehicle 12 is loading or unloading a tractor trailer. In some non-limiting examples, the task 430 may be classified as loading or unloading a tractor trailer upon determining that the sum of the first predefined distance and the second predefined distance is less than or equal to a total predefined distance (e.g., less than or equal to about 200 feet).

During operation of the vehicle classification system 100, the forward or rear facing cameras 122, the encoders 120, the fork position 144, the load weight 154, and the real-time location system 130 may be some of the sensors 103 that the vehicle controller 104 uses to determine that the material handling vehicle 12 is performing the activity of task 430 (see, e.g., FIG. 3). In one non-limiting example, a traction wheel encoder distance may be used to determine the distance moved by the material handling vehicle 12. The prediction may further be corroborated with images captured from a camera or a positioning system mounted on the material handling vehicle 12. After the activity has been identified, the vehicle's settings can be modified in a predetermined and configurable fashion. In the case of task 430, similar to the task 400 and the task 420, a lift limit bypass feature may be turned on with a value to prevent the forks from exceeding a trailer ceiling height. However, in some non-limiting examples, the vehicle's settings may be modified differently to advantageously assist the operator and/or the material handling vehicle 12.

Figure 7:
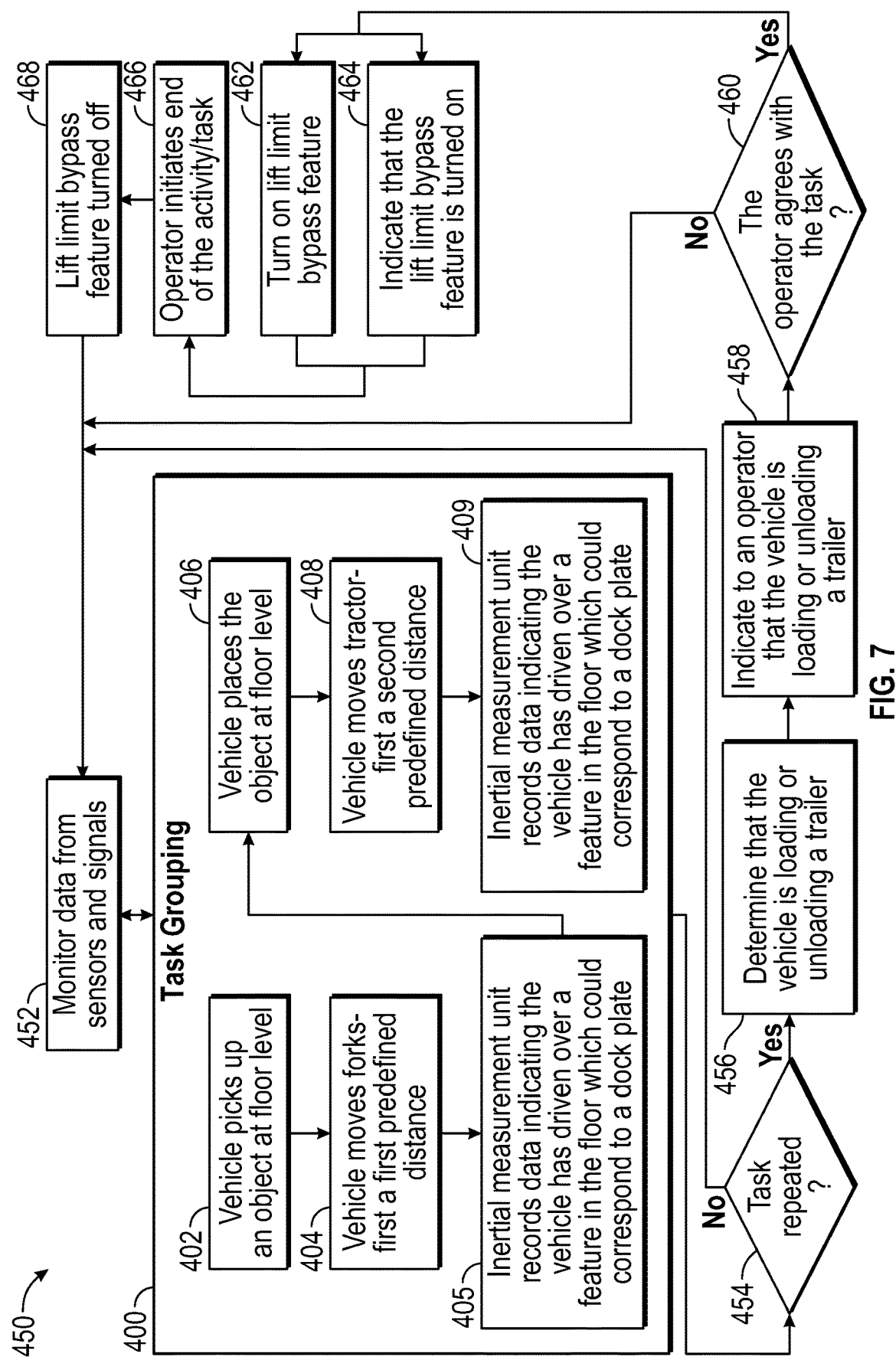
FIG. 7 is a flowchart outlining steps for the process of FIG. 6A for the vehicle classification system.

FIG. 7 illustrates a non-limiting sequence of steps 450 the vehicle classification system 100 may undergo once it identifies the activity as task 400, described with reference to FIG. 6A above. In step 452, the material handling vehicle 12 may operate in its standard mode while the sensors 103 send data to the vehicle controller 104. The sensors 103 can be constantly monitoring the vehicle's surroundings and signals to determine if an activity is being performed. Once the vehicle controller 104 receives the data, the data may be grouped based on patterns or repetitions, as explained above. In this case, the vehicle controller 104 groups the steps 402, 404, 406, 408 together. This data may be recognized by the vehicle controller 104 as being an activity similar to task 400, detailed in FIG. 6A.

In step 454, similar to process block 410 in FIG. 6A above, the vehicle classification system 100 can then wait and check to see if the task 400 has been previously repeated. If it has not, the vehicle classification system 100 may then return to step 452 in order to collect information from the sensors 103. In step 454, if the activity has been repeated, the vehicle classification system 100, at step 456, can determine that the task 400 is being performed, i.e., the material handling vehicle 12 is loading or unloading a trailer. In this case, the vehicle classification system 100 may notify the operator at step 458 that it believes the operator is loading or unloading a trailer. The operator can then have the option to override and cancel the changes, or continue with the changes at step 460. If the operator overrides and cancels the changes, the vehicle classification system 100 can then return to step 452, monitoring the sensors 103. On the other hand, if the operator accepts the activity, the vehicle classification system 100 can move to step 462 and turn on the lift limit bypass feature. Concurrently, in step 464, the operator can receive feedback from the system that the lift limit bypass feature is turned on.

In another non-limiting example, the vehicle classification system 100 can automatically turn on the lift limit bypass feature once it recognizes task 400, without waiting for the operator to accept the activity. In this case, the operator can still veto or cancel the activity, however, the vehicle classification system 100 may notify the operator that the vehicle classification system 100 believes the operator is performing a certain activity and has therefore taken the liberty to put certain changes in place. Once the lift limit bypass feature is turned on in step 462, the forks 32 and/or the mast 20 may be prevented from raising above a predetermined height. This can allow the operator to effectively move in and out of a trailer quickly and efficiently.

After the operator has finished unloading/loading the trailer, the operator can initiate the end of the activity or task in step 466. This can be done, for example, by pressing an end button, turning the vehicle off, instructing a different command to the vehicle, or initiating through a wireless system. Once the activity has ended, the vehicle classification system 100 can turn the lift limit bypass feature off in step 468. The vehicle classification system 100 may then return to step 452 were it continues to monitor its sensors 103 until a new activity is determined. In one non-limiting example, the vehicle classification system 100 may turn on the lift limit bypass feature once the material handling vehicle 12 has driven over the dock plate to enter the trailer, as illustrated at process block 405 in FIG. 6A. Then, the vehicle classification system 100 may turn off the lift limit bypass feature once the material handling vehicle 12 has driven over the dock plate to exit the trailer, as illustrated at process block 409 in FIG. 6A. In another non-limiting example, the vehicle classification system 100 can constantly monitor the sensors 103 to identify an activity even if the task 400 has already been determined. In other words, the vehicle classification system 100 can always be in step 452, no matter what other step it may be at in the sequence of steps 450.

In other non-limiting examples, the sequence of steps 450 may alternatively be performed once the vehicle classification system 100 identifies the activity of task 420, described above with reference to FIG. 6B, or task 430, described above with reference to FIG. 6C. Therefore, instead of the vehicle controller 104 grouping task 400 together (see FIG. 6A), the vehicle classification system 100 may monitor data from the sensors and signals, in step 452, until the vehicle controller 104 groups task 420 (see FIG. 6B) or task 430 (see FIG. 6C). As such, tasks 400, 420, 430 may result in the lift limit bypass feature being turned on during loading and unloading a tractor trailer. As noted herein, if task 420 (see FIG. 6B) is identified, step 454 may be removed from the sequence of steps 450 resulting therefrom.

Figure 8:
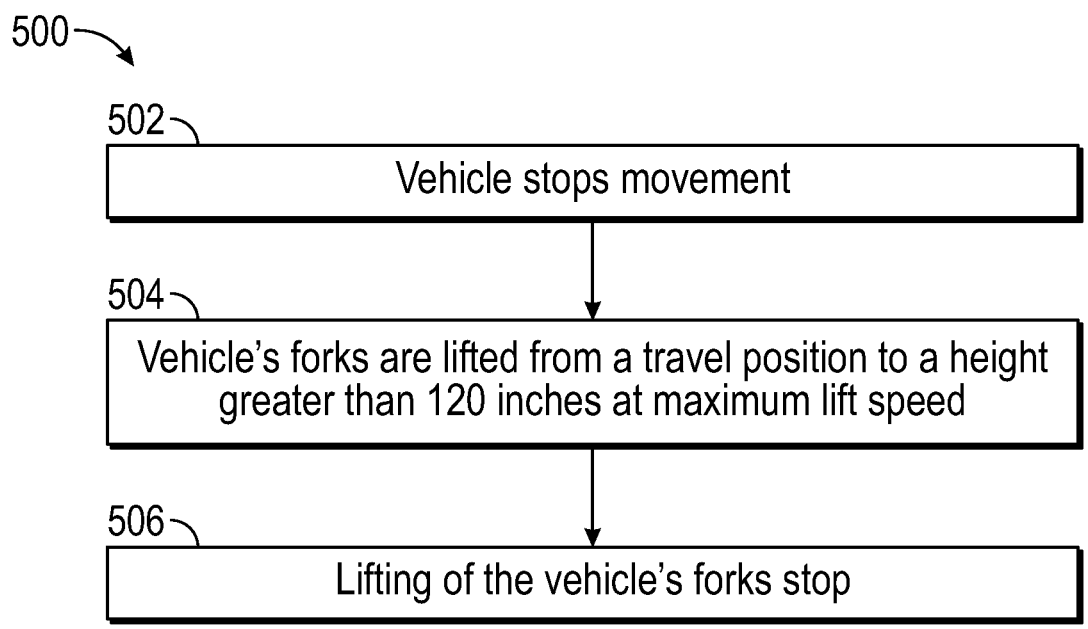
FIG. 8 is another process or method recognized by a vehicle classification system according to one aspect of the present disclosure.

FIG. 8 illustrates another non-limiting process of a vehicle task 500 that the vehicle classification system 100 may recognize as an activity while it is operating, according to one non-limiting example of the present disclosure. The task 500 may result in the vehicle classification system 100 manipulating the material handling vehicle 12 to assist the operator in performing the activity. All of the following steps may be recognized through the quantities measured or discrete signals communicated between the plurality of sensors 103 and the vehicle controller 104. First, the task 500 may include the material handling vehicle 12 moving in any direction for a period of time and then coming to a complete stop at process block 502. Once the material handling vehicle 12 has stopped, the forks of the material handling vehicle 12 may lift from a travel position to a height greater than a first predefined height (e.g., greater than 120 inches at maximum lift speed) at process block 504. This distance is non-limiting and may be preset depending on the characteristics of the material handling vehicle 12, warehouse, docking station, etc. At process block 506, the lifting of the forks may come to a complete stop. The vehicle classification system 100 may then recognize that the operator is adjusting the forks for a pickup or put away at height. In one non-limiting example, the fork tip camera 118, the real-time location system 130, the lift motor RPM 140, the fork height 142, and the load weight 154 may be some of the sensors 103 that the vehicle controller 104 uses to determine that the material handling vehicle 12 is performing the activity of task 500. (see, e.g., FIGS. 3 and 8).

The prediction may further be corroborated with images captured from a camera or a positioning system mounted on the material handling vehicle 12. After the activity has been identified, the vehicle's settings can be modified in a predetermined and configurable fashion. In the case of task 500, the material handling vehicle 12 may temporarily remap its lift commands so that the maximum lift or lower speed is approximately half of the full speed, thereby offering more precise control in the activity. In another non-limiting example, once the vehicle classification system 100 has recognized that the material handling vehicle 12 is preforming a pickup or put away at height, the vehicle classification system 100 may allow the telescoping masts 20 to move with an increased speed when the forks 32 are not carrying a load, which may allowing the operator to perform the task more efficiently.

Figure 9:
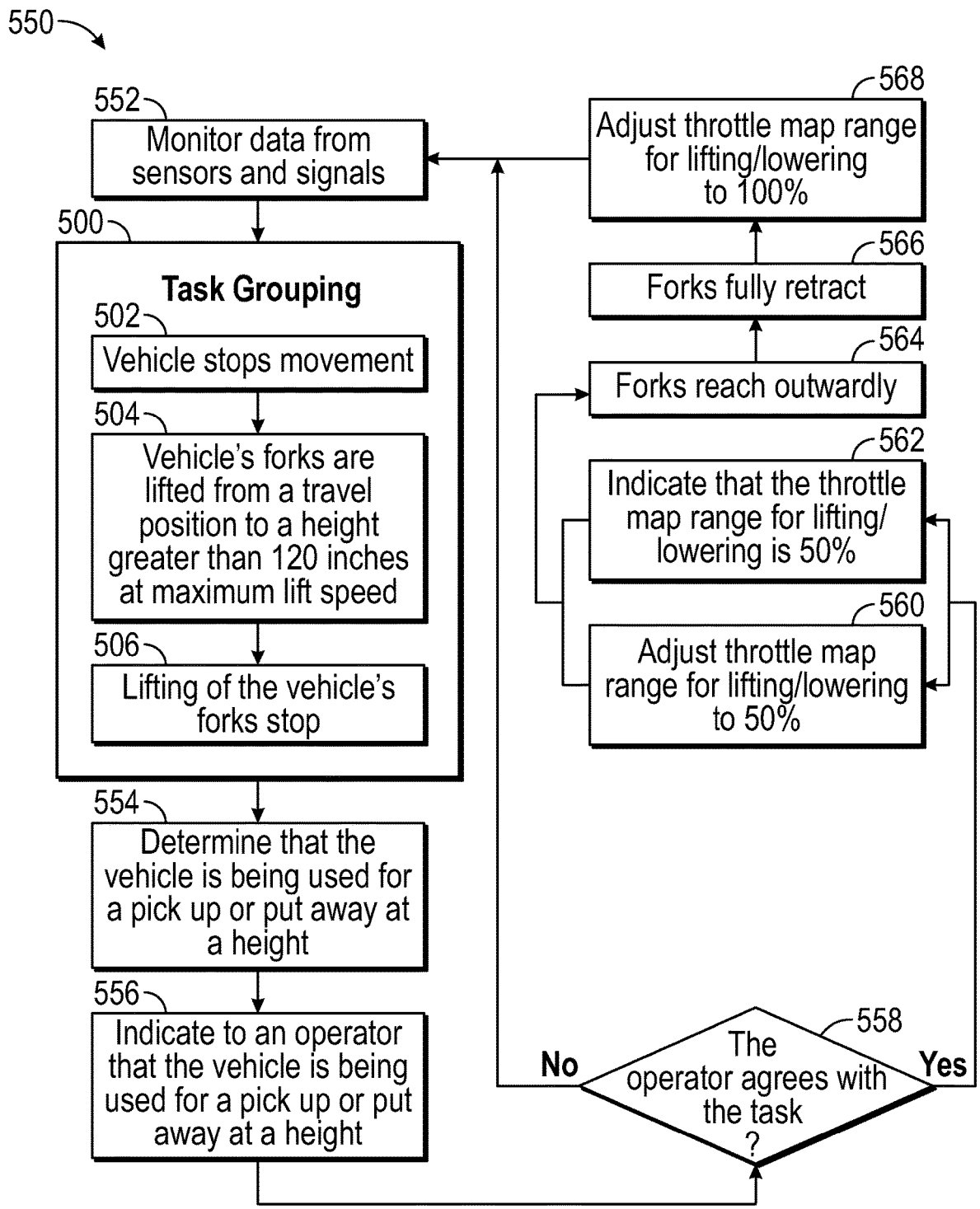
FIG. 9 is a flowchart outlining steps for the process of FIG. 8 for the vehicle classification system.

FIG. 9 illustrates a non-limiting sequence of steps 550 the vehicle classification system 100 may undergo to determine and assist the task 500, as described with respect to FIG. 8 above. In step 552, the material handling vehicle 12 may be operating in the standard mode while the sensors 103 send data to the vehicle controller 104. The sensors 103 may be constantly monitoring the vehicle's 12 surroundings and signals to determine an activity. Once the vehicle controller 104 receives the data, the data may be grouped based on patterns or repetition, as explained above. In this case, the vehicle controller 104 groups the steps 502, 504, 506 together. This data may be recognized as being similar to the task 500 detailed above in FIG. 8.

At step 554, the vehicle classification system 100 may recognize task 500 and, thus, may determine that the material handling vehicle 12 is being used for a pick up or put away at height. In this case, the vehicle classification system 100 may notify the operator at step 556 that it believes the material handling vehicle 12 is being used for a pick up or put away at height. The operator can then be provided with the option to override and cancel the changes or continue with the changes at step 558. If the operator overrides or cancels the changes, the vehicle classification system 100 will return to step 552, monitoring the sensors 103. On the other hand, if the operator accepts the activity, the vehicle classification system 100 can move to step 560 and adjust the throttle map range for lifting and lowering to approximately a fifty percent reduction. Concurrently, in step 562, the operator can receive feedback from the system that the throttle map range for lifting and lowing has been lowered to approximately fifty percent. In another non-limiting example, the throttle map range may be altered to a different percent then described above. For example, the vehicle classification system 100 may adjust the throttle map range for lifting and lowering to any range approximately between ten percent and ninety percent reduction.

In yet another non-limiting example, the vehicle classification system 100 can automatically adjust the throttle map range for lifting and lowering to approximately fifty percent, or another predefined value, once it recognizes the task 500 without waiting for the operator to accept the activity. In this case, the operator can still veto or cancel the activity, however, the vehicle classification system 100 may notify the operator that the vehicle classification system 100 believes the operator is performing a certain activity and has therefore taken the liberty to put certain changes in place, i.e., adjusting the throttle map range for lifting and lowering to approximately fifty percent.

Once the operator has already moved the forks to the approximate height, as illustrated in process block 504, the operator may only need to make small adjustments to the fork height. Therefore, by lowering the throttle map range for lifting and lowing from full operating limits to approximately a fifty percent reduction, the operator may have more precise control of the forks for fine tuning the position. This may result in quicker and more efficient operations by the operator when trying to pick up or put away an object at height.

In step 564, the operator may extend the forks to place or pick up an object. Then, in step 566, the operator may fully retract the forks to an original position. The vehicle classification system 100 can wait for the forks to extend and fully retract before restoring full speed lift and lowering in step 568. Once the throttle map range for lifting and lowering have returned to full operating limits in step 568, the vehicle classification system 100 may then return to step 552 were it may continue to monitor its sensors 103 until a new activity is determined. In another non-limiting example, the operator can manually restore the throttle map range to full operating limits without needing to extend and fully retract the forks of the material handling vehicle 12. In a further non-limiting example, the vehicle classification system 100 can constantly monitor the sensors 103 to identify an activity even if the task 500 has already been determined. In other words, the vehicle classification system 100 can always be in step 552, no matter what other step it may be at in the sequence of steps 550.

Figure 10:
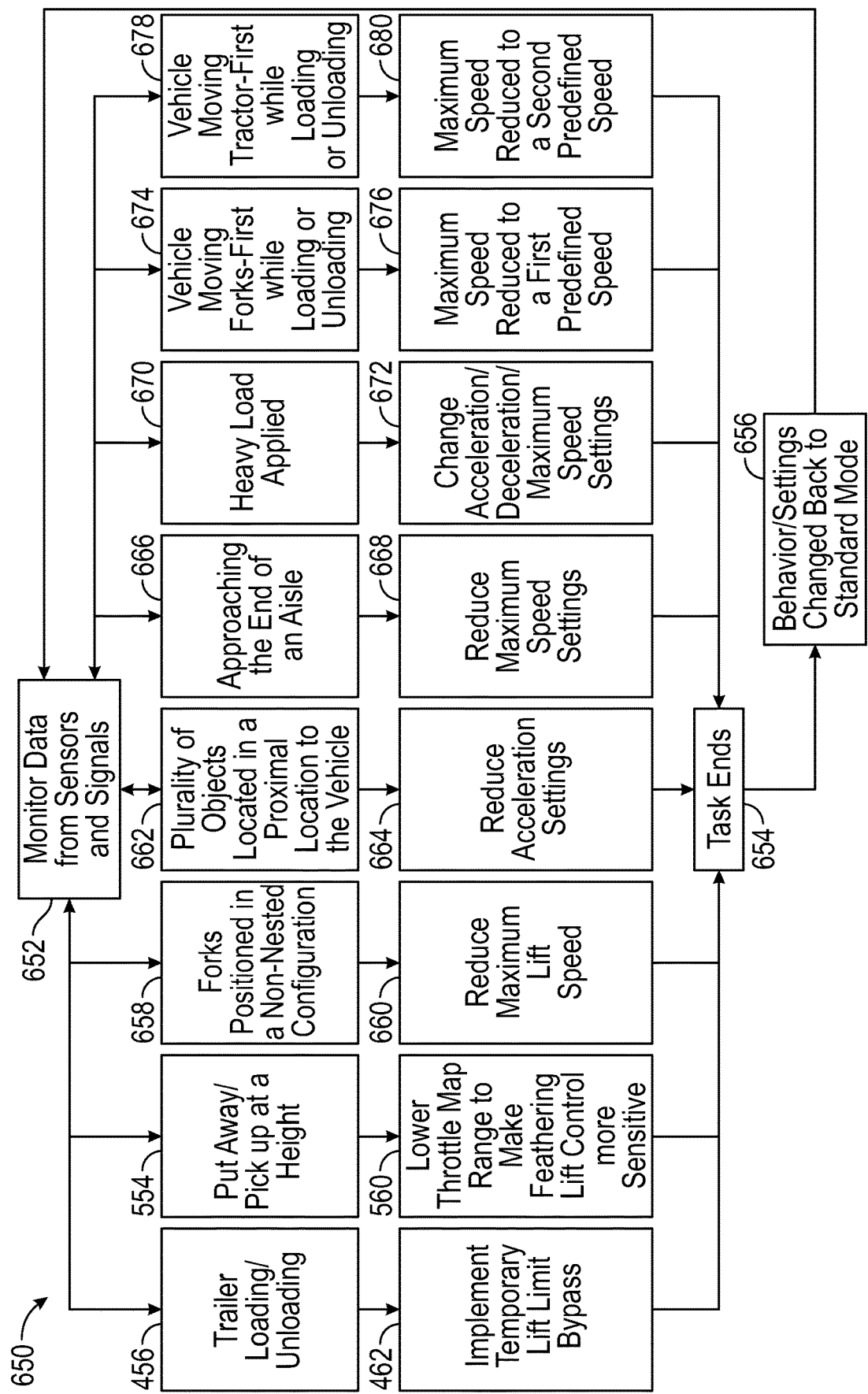
FIG. 10 is flowchart illustrating activities that a vehicle classification system can recognize according to one aspect of the present disclosure.

FIG. 10 illustrates another non-limiting set of steps 650 that the vehicle classification system 100 may undergo during operational use. FIG. 10 is a simple representation of some of the many different examples the vehicle classification system 100 can recognize as an activity or task, and the resultant behavior that is modified because of the activity or task that is determined. In step 652, the vehicle classification system 100 can be operating in the standard mode while the sensors 103 send data to the vehicle controller 104. The sensors 103 may be constantly monitoring the vehicle's surroundings and signals to determine if an activity is being performed. In the case of step 456, the vehicle classification system 100 may determine that task 400 is being performed. As explained above with respect to FIGS. 6-7, the vehicle classification system 100 may determine that the material handling vehicle 12 is being used to load or unload a trailer. As a result, the vehicle classification system 100 can implement a temporary lift limit bypass in step 462 to assist the operator. This temporary lift limit bypass can be kept on until the activity is ended in step 654. As a result, the behavior or settings that were changed may return back to the standard mode in step 656. Finally, the vehicle classification system 100 can then return back to step 652 were it will continue to monitor its sensors 103 until a new activity is determined.

In an alternative non-limiting example, the vehicle classification system 100 may recognize that the vehicle is performing task 500, i.e., the vehicle is adjusting the forks for a pickup or put away at a height, in step 554. As a result and as explained above in FIGS. 8 and 9, the throttle map range can be lowered to make feathering the lift control more sensitive in step 560. Again, once the activity ends in step 654, the vehicle's behavior or settings can be converted back to its standard mode at step 656, and the vehicle classification system 100 may return to step 652 to monitor its sensors 103. Therefore, the vehicle classification system 100 is a constant cycle of recognizing an activity the material handling vehicle 12 is performing and adjusting or modifying the behavior of the material handling vehicle 12 to assist the operator in performing the task or activity. The additional steps, explained below, are non-limiting and show just a few of the many activities that the vehicle classification system 100 can be designed to recognize as a task during normal operational use.

In step 658, the vehicle classification system 100 can recognize that the forks are positioned in a non-nested configuration. As a result, the maximum lift speed may be reduced in step 660. In step 662, the vehicle classification system 100 may recognize a high number of objects are located in a proximal location to the material handling vehicle 12. In step 664, the vehicle classification system 100 can then reduce the acceleration settings of the material handling vehicle 12. In one non-limiting example at step 666, the vehicle classification system 100 may recognize that the material handling vehicle 12 is approaching the end of aisle or passage with a high known level of traffic. As a result, the vehicle classification system 100 may turn to step 668, which reduces the maximum speed settings of the material handling vehicle 12.

In another non-limiting example, the vehicle classification system 100 may recognize that a heavy load is applied to the forks in step 670. In response, the vehicle classification system 100 may be able to change the acceleration, deceleration, or maximum speed settings based on the type of load that is applied in step 672. In a further non-limiting example, the vehicle classification system 100 may recognize that the material handling vehicle 12 is moving forks-first while loading or unloading at step 674. As a result, the maximum speed of the material handling vehicle 12 may be reduced to a first predefined maximum speed at step 676. Alternatively, in step 678, the vehicle classification system 100 may determine that the vehicle is moving tractor-first while loading or unloading. In this case, the maximum speed may be reduced to a second predefined maximum speed in step 680. This feature can help train operators or autonomous vehicles to drive in a load trailing configuration, i.e., tractor-first. As noted herein, any of the sensors 103 or internal signals illustrated in FIG. 3 may be used to identify the tasks outlined in FIG. 10. As such, the vehicle classification system 100 can use a variety of sensors 103 to determine various tasks or activities.

All of the above examples can function until the end of the activity is initiated in step 654. Then, the vehicle classification system 100 may move to step 656 where the behavior settings return to normal or the modifications are turned off. Finally, the vehicle classification system 100 may then move back to step 652 were it would continue to monitor the material handling vehicle's 12 behavior until another activity is determined. As noted herein, the end of the activity can be initiated in a variety of ways. For example, the operator may indicate to the vehicle classification system 100 that the activity is ended, or the vehicle classification system 100 can determine on its own that the activity has ended.

In one non-limiting example, the vehicle classification system 100 can determine that multiple activities are being performed at the same time. For example, while the vehicle classification system 100 is performing task 400, i.e., loading or unloading a trailer, the vehicle classification system 100 may determine that a plurality of objects are located around the loading or unloading zone, i.e., step 662. Therefore, the material handling vehicle 12 acceleration settings can be reduced (step 664) while a temporary lift limit bypass (step 462) is applied. In another non-limiting example, the vehicle classification system 100 can always be in step 652, monitoring its sensors and signals, to determine if another activity is being performed while carrying out a different task or activity.

The vehicle classification system 100 can help operators perform more effectively, or autonomous vehicles operate more efficiently, since the material handling vehicle 12 may be provided with advanced assistance that is relevant to the situation being performed. This, in turn, can help provide increased reliability and efficiency for the material handling vehicle 12 and for the warehouse, docking station, or environment in which the material handling vehicle 12 operates within.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A method for task characterization on a material handling vehicle, comprising:
   receiving data, via a vehicle controller, from one or more on-board sensors that are disposed on the material handling vehicle;
   monitoring the data communicated between the one or more on-board sensors and the vehicle controller on the material handling vehicle;
   identifying, via the vehicle controller, a repetition or pattern in the monitored data, the repetition or pattern including:
   picking up an object;
   moving forks-first less than or equal to a first predefined distance;
   detecting that the material handling vehicle drives over a feature in a floor;
   placing the object;
   moving tractor-first less than or equal to a second predefined distance; and
   detecting that the material handling vehicle drives over the feature in the floor;
   determining, via the vehicle controller, whether the repetition or pattern in the monitored data is a vehicle task, wherein the vehicle task is classified as loading or unloading a trailer; and
   modifying, via the vehicle controller, an operational parameter of the material handling vehicle based on the determined vehicle task.

2. The method of claim 1, wherein modifying, via the vehicle controller, the operational parameter of the material handling vehicle includes the vehicle controller turning on a lift limit bypass feature.

3. The method of claim 2, wherein the lift limit bypass feature prevents a height of a mast or a fork of the material handling vehicle from raising above a predetermined height.

4. The method of claim 1, further comprising:
   receiving an indication that the vehicle task has ended.

5. The method of claim 4, further comprising:
   turning off, via the vehicle controller, a lift limit bypass feature upon receiving the indication that the vehicle task has ended.

6. The method of claim 1, wherein the feature in the floor is a dock plate.

7. The method of claim 6, wherein the dock plate provides an indication that the material handling vehicle is entering or exiting the trailer.

8. The method of claim 1, further comprising:
   providing, via the vehicle controller, an indication to an operator of the material handling vehicle that the vehicle task is classified.

9. The method of claim 8, further comprising:
allowing the operator to override the classified vehicle task and the modified operational parameter.

10. The method of claim 1, wherein the second predefined distance is within a predetermined tolerance of the first predefined distance.

11. A method for task characterization on a material handling vehicle, comprising:
receiving data, via a vehicle controller on the material handling vehicle, from one or more on-board sensors that are disposed on the material handling vehicle;
monitoring the data communicated between the one or more on-board sensors and the vehicle controller, wherein the material handling vehicle includes a mast and forks;
identifying, via the vehicle controller, a repetition or pattern in the monitored data, the repetition or pattern including:
picking up an object at floor level;
moving less than or equal to a predefined distance;
placing the object; and
moving less than or equal to the predefined distance;
determining, via the vehicle controller, whether the repetition or pattern in the monitored data is a vehicle task, wherein the vehicle task is classified as loading or unloading a trailer; and
reducing, via the vehicle controller, a maximum height of the mast or the forks to below a predetermined height based on the vehicle task.

12. The method of claim 11, further comprising:
providing, via the vehicle controller, an indication to an operator of the material handling vehicle that the vehicle task is classified.

13. The method of claim 11, further comprising:
providing, via the vehicle controller, an indication to an operator of the material handling vehicle that the maximum height of the forks or the mast is reduced to the predetermined height.

14. The method of claim 11, further comprising:
receiving an indication that the vehicle task has ended.

15. The method of claim 14, further comprising:
turning off, via the vehicle controller, the reduced maximum height of the mast or the forks upon receiving the indication that the vehicle task has ended.

16. The method of claim 11, wherein a distance moved by the material handling vehicle is determined by a traction wheel encoder.

17. A method for task characterization on a material handling vehicle, comprising:
receiving data, via a vehicle controller on the material handling vehicle, from one or more on-board sensors that are disposed on the material handling vehicle, wherein the material handling vehicle includes a mast and forks;
identifying, via the vehicle controller, a repetition or pattern in the received data, the repetition or pattern including:
picking up an object at floor level;
moving a first predefined distance;
placing the object;
moving a second predefined distance;
determining, via the vehicle controller, whether the repetition or pattern in the received data is a vehicle task once the repetition or pattern has been repeated one or more times, the vehicle task being loading or unloading a trailer; and
modifying, via the vehicle controller, an operational parameter of the material handling vehicle based on the determined vehicle task, wherein the operational parameter is a maximum height of the mast or the forks.

18. The method of claim 17, further comprising:
providing, via the vehicle controller, an indication to an operator of the material handling vehicle that the vehicle task is classified.

19. The method of claim 17, further comprising:
receiving an indication that the vehicle task has ended.

20. The method of claim 19, further comprising:
turning off, via the vehicle controller, the modified operational parameter upon receiving the indication that the vehicle task has ended.

* * * * *